Dec. 20, 1966   A. D. BENTLEY   3,292,444
DRIVE MECHANISM FOR FILM STRIP
Filed Feb. 15, 1965
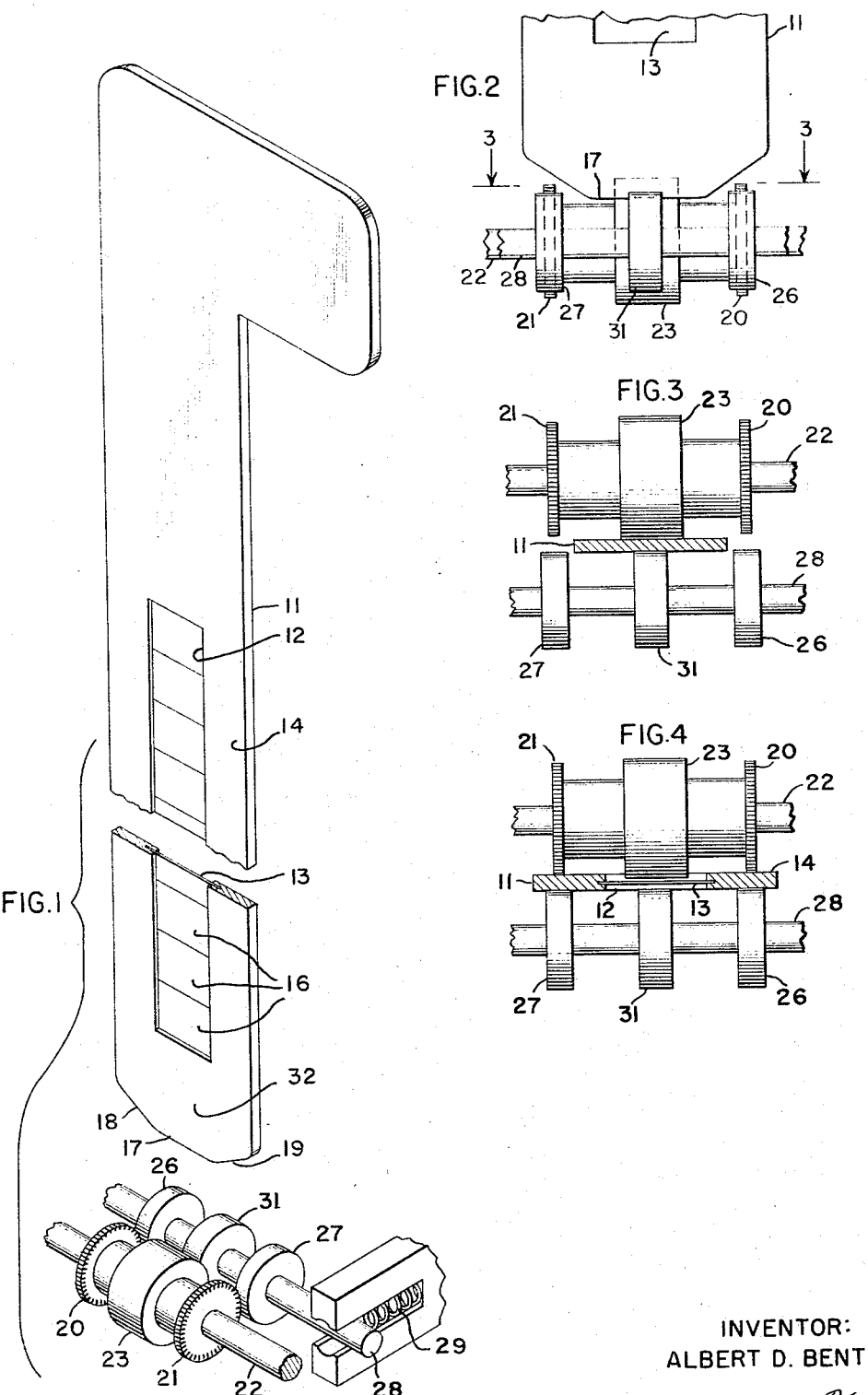
INVENTOR:
ALBERT D. BENTLEY,
BY   Norman C. Fulmer
HIS ATTORNEY.

United States Patent Office 3,292,444
Patented Dec. 20, 1966

3,292,444
DRIVE MECHANISM FOR FILM STRIP
Albert D. Bentley, New Hartford, N.Y., assignor to General Electric Company, a corporation of New York
Filed Feb. 15, 1965, Ser. No. 432,574
4 Claims. (Cl. 74—206)

This invention relates to drive mechanisms for film strips, such as are used in certain film projectors. The invention is particularly useful for driving the film strip in a phonograph-viewer of the type described in co-pending patent application Serial No. 393,049, filed August 31, 1964, and assigned to the same assignee as the present invention.

The film strip drive mechanism described in the aforesaid co-pending patent application comprises drive wheels for causing desired movement of a film strip mounted in a holder, and performs satisfactorily insofar as driving the film strip; however, it has been found that repeated insertion of the film strip holder into the drive mechanism causes wear, tear, and mangling of the holder at the leading edge thereof which engages the drive wheels when the film strip holder is being inserted into position for use, thereby rendering the film holder unsightly and making it difficult to insert into the drive mechanism. This objectionable mangling of the film strip holder is even more severe when the drive wheels are provided with teeth or rubber rims for improved driving action and/or when the film strip holder is made of cardboard or of other relatively soft material.

An object of the invention is to provide an improved drive mechanism for a film strip.

Another object is to provide an improved film strip drive mechanism which prevents mangling of the film strip holder.

Still other objects will be apparent from the following description and claims, and from the accompanying drawing.

The improved drive mechanism of the invention comprises, basically and in a preferred embodiment, a pair of spaced-apart drive wheels carried by a drive shaft and adapted to engage and drive a film strip holder having a cut-out slot or opening in which the film strip is provided in a recessed manner. The drive wheels are adapted to engage a surface of the holder in flanking relationship to the film strip opening. A center wheel is mounted on the drive shaft, and preferably has a diameter slightly greater than that of the drive wheels, and has a width less than that of the film strip opening in the holder, so that when the film strip holder is being inserted into operating position the center wheel is first contacted by the leading edge of the film strip holder thereby preventing damaging contact of the drive wheels with this leading edge. In operation of the device, the center wheel projects partially into the film-strip opening of the film strip holder (but not in damaging contact with the recessed film strip) so that the drive wheels make proper contact with the holder for driving it in desired manner. Further, in accordance with the invention, the leading edge of the film strip holder may be provided with beveled corners for improved functioning of the invention. Still further, the invention contemplates the provision of a stabilizing wheel positioned adjacent to and in alignment with the aforesaid center wheel and adapted to bear against the back surface of the film strip holder to prevent bending of the holder when the aforesaid center wheel engages against the front surface thereof.

In the drawing:

FIG. 1 is a perspective view of a film strip holder and drive mechanism therefor, in accordance with a preferred embodiment of the invention;

FIG. 2 is a rear view of the arrangement when the leading edge of the film holder is being inserted into contact with the drive mechanism;

FIG. 3 is a cross-sectional view taken on the line 3—3 of FIG. 2; and

FIG. 4 is a cross-sectional view similar to that of FIG. 3, but with the film holder completely inserted into operating position in the drive wheel mechanism.

Now referring to the drawing, a film-holder 11, which may be made from cardboard, plastic, or other suitable materials, is provided with a cut-out portion or opening 12 in which a film strip 13 is held and positioned in a recessed manner, as shown, it being important for the purpose of this invention that the film strip 13 be recessed with respect to the front surface 14 of the holder 11. The film strip 13 comprises a sequence of frames 16 containing pictures or other information, in well-known manner. The bottom end 17 of the holder 11, which is the leading edge thereof when the holder is inserted into its drive mechanism, preferably though not necessarily is beveled at the corners thereof as indicated at numerals 18 and 19.

The drive mechanism comprises a pair of drive wheels 20 and 21 carried by a drive shaft 22 which is driven by suitable means such as the intermittent motion means described and claimed in the aforesaid co-pending patent application. The drive wheels 20 and 21 preferably are provided with a series of fine teeth at the periphery thereof, as shown in the drawing, or alternatively may be provided with rubber rims, for insuring good driving contact against the front surface 14 of the film holder 11.

In accordance with the present invention, a center wheel 23 is provided on the drive shaft 22, between the drive wheels 20 and 21. The center wheel 23 has a diameter as great as, and preferably slightly greater than, the diameters of the drive wheels 20 and 21, and this center wheel 23 has a width which is less than the width of the opening 12 in the film holder 11. The center wheel 23 may be rigidly attached to, or free to rotate around, the drive shaft 22. A pair of back-up wheels 26 and 27 are positioned on a back-up shaft 28 and located adjacent to and respectively in alignment with the drive wheels 21 and 20, as shown, and are urged toward these drive wheels by means of a spring 29, so that when the film holder 11 is inserted in operative position between the drive wheels 20, 21, and the associated back-up wheels 26 and 27, the drive wheels 20 and 21 will be in suitably tight engagement against the front surface 14 of the holder 11 so as to reliably drive the holder 11 for accurate sequential positioning of the respective film frames 16 for optical projection, in response to rotary motion of the drive shaft 22.

If desired, and as a further feature of the invention, an alignment wheel 31 may be provided on the back-up shaft 28 between the back-up wheels 26 and 27, and preferably has a diameter the same as that of the back-up wheels 26 and 27.

The invention functions as follows: When the film holder 11 is being inserted into the drive mechanism, the leading edge 17 thereof first contacts the center wheel 23, rather than the drive wheels 20 and 21, and, since the center wheel 23 has a diameter at least as great as that of the drive wheels 20 and 21, this causes the drive wheels to be forced out of engagement with, or at least reduces the contact pressure thereof against, the surface of the holder 11, at the leading edge 17 and in the lower region 32 of the holder 11. The center wheel 23 is smooth so as not to injure the holder 11. The beveled corners 18 and 19 at the leading edge 17, if provided, further insure that the drive wheels 21 and 22 will not bear against the leading edge 17 when the holder 11 is being inserted into the drive mechanism. FIGURES 2 and 3 particularly illustrate the arrangement of parts when the film holder 11 is being inserted into the drive mechanism.

When the film holder 11 is in operative position, as shown in FIG. 4, so as to be driven by the drive wheels 20 and 21, the center wheel 23, which has served its purpose of preventing mangling of the film holder 11 when being inserted into the driving mechanism, now projects partially into the film opening 12 and hence is no longer effective in reducing or eliminating contact pressure of the drive wheels 20 and 21 against the holder 11, so that now the drive wheels bear against the front surface 14 of the holder 11 with sufficient pressure for properly driving the holder 11. Since the film 13 is recessed in the opening 12 with respect to the front surface 14 of the holder 11, the center wheel 23, which projects only slightly within the opening 12, does not come into damaging contact with the film 13, or at most contacts against the film 13 with such slight pressure so as not to damage it.

The alignment wheel 31, which may be provided on the back-up shaft 28 if desired, prevents any tendency for bending of the holder 11 which might otherwise occur when the center wheel 23 is in engagement against the lower portion 32.

It has been found that the invention adequately meets its objective of preventing mangling of the leading edge 17 of the film holder 11 which otherwise would occur upon repeated insertion of the holder 11 into the drive mechanism if the leading edge 17 were permitted to come into contact against the drive wheels 20 and 21. The invention also prevents further mangling of the leading edge 17 which would otherwise occur when the drive wheels 20 and 21 would ride off the leading edge when the film holder 11 is removed from the drive mechanism.

While a preferred embodiment of the invention has been shown and described, other embodiments and modifications thereof will be apparent to those skilled in the art, and will fall within the scope of invention as defined in the following claims.

What I claim is:

1. A drive mechanism for a film-strip holder carrying a film strip in an opening therein and provided with a recess from a surface thereof, comprising a drive shaft carrying at least one drive wheel adapted to engage said surface of the holder for moving the holder when the holder is placed in operative position, and an additional wheel provided on said drive shaft and having a diameter sufficiently large so that said additional wheel rides on said surface of the film holder and relieves pressure of said drive wheel on the holder during insertion of said holder into operative position in said drive mechanism, said additional wheel being adapted to project into said recess when the film holder is in operative position thereby permitting said drive wheel to engage in driving relation against said surface of the film holder.

2. A drive mechanism for an elongated film-strip holder carrying a film strip in an elongated opening therein, said film strip being recessed from a surface of said holder, comprising a drive shaft carrying a pair of drive wheels spaced apart so as to be engageable against said surface of the film holder in flanking relationship to said elongated film opening, back-up means adjacent said drive wheels for causing said drive wheels to engage said front surface when the holder is inserted into operative position between said drive wheels and back-up means, said holder being insertable into said operative position by sliding the elongated holder axially into the space between the drive wheels and back-up means, and a center wheel carried by said drive shaft between the drive wheels and having a diameter at least as large as that of said drive wheels and a width narrower than that of said elongated opening, so that when said holder is being inserted into said drive mechanism the holder engages said center wheel thereby relieving pressure of said drive wheels against said holder in the vicinity of the leading edge thereof, whereupon the center wheel projects into said opening when the holder is in operative position thereby permitting said drive wheels to engage in driving relation against said film holder, said center wheel being sufficiently small in diameter so as not to come into damaging contact with said recessed film.

3. A drive mechanism as claimed in claim 2, in which said leading edge of the film holder is beveled at the corners thereof.

4. A drive mechanism as claimed in claim 2, in which said back-up means includes a stabilizing wheel positioned in alignment with said center wheel and adapted to engage against the rear surface of said film holder when said center wheel is engaged against the front surface thereof.

No references cited.

DAVID J. WILLIAMOWSKY, *Primary Examiner.*

L. H. GERIN, *Assistant Examiner.*